United States Patent [19]

Sato

[11] Patent Number: 4,858,930
[45] Date of Patent: Aug. 22, 1989

[54] GAME SYSTEM

[75] Inventor: Seiichi Sato, Tokyo, Japan

[73] Assignee: Namco, Ltd., Tokyo, Japan

[21] Appl. No.: 203,134

[22] Filed: Jun. 7, 1988

[51] Int. Cl.⁴ .............................................. A63F 9/22
[52] U.S. Cl. ................................. 273/85 G; 273/1 E;
273/DIG. 28; 364/410
[58] Field of Search .................... 273/1 E, 1 R, 85 G,
273/DIG. 28, 138 A; 364/410, 411, 412

[56]        References Cited
        U.S. PATENT DOCUMENTS 4,342,454  8/1982  Baer et al. ........................ 273/85 G
4,575,622  3/1986  Pellegrini ..................... 273/DIG. 28
4,679,789  7/1987  Okada ................................. 273/1 E
4,752,068  6/1988  Endo .................................. 273/1 E Primary Examiner—Leo P. Picard
Assistant Examiner—Jessica J. Harrison
Attorney, Agent, or Firm—Oliff & Berridge

[57]            ABSTRACT

A game system comprises a home video game machine in which a game is played and the ability of a character which appears in the game is calculated and set with the progress of the game in accordance with a predetermined home game program and a commercial video game machine in which a game is played in a commercial game space of a higher grade than that of the home game space and the ability of a character which appears in the game is calculated and set with the progress of the game in accordance with a commercial game program which is produced by expanding the home game program. The ability of the character calculated and set in the home video game is input to the commercial video game machine as the initial ability data of the character which appears in the commercial video game.

14 Claims, 11 Drawing Sheets

FIG. 4

| ABILITY ||
|---|---|
| POWER | ITEM |
| PHYSICAL STRENGTH    12 | EXPERIENCE POINT    0 POINT |
| INTELLECT    8 | GOLD COINS    50 COINS |
| LIFE FORCE    15 | EQUIPMENT    DAGGER LEATHER ARMOR |
| AGILITY    12 | |

EXAMPLE OF WORLD IN COMMERCIAL GAME

EXAMPLE OF WORLD IN HOME GAME

GAME SYSTEM

BACKGROUND OF THE INVENTION

1. Field of the Invention

The present invention relates to a game system and, more particularly, to an initial data input system for a commercial video game machine.

2. Description of the Prior Art

A multiplicity of video game programs have recently been developed with the spread of video game machines.

Such a video game is so designed that various kinds of characters appear in the game space in accordance with the story of the game.

In most types of the recent video games, the ability of a character such as the hero of the game operated by the player makes an influence on the progress of the game. As such ability setting types of games, role playing games and simulation games etc. are known.

In this type of game, the game proceeds in such a manner that the player sets the ability data of a character in advance, and the ability data of the character changes successively with the development of the game.

In a roll playing game, for example, when the player creates a character which is to appear in the game such as a person who is to appear in the game and determines the name, kind (e.g., a human being and a fairy), occupation (e.g., a warrior and a witch), etc. prior to the start of the game, the initial ability of the character such as the physical strength, intellect, life force and agility are automatically set in correspondence with the character. The ability of the character initially set in this manner is expressed numerically, and if a character has succeeded in an action, the numerical value increases, thereby enabling the character to defeat the strong enemies against which the character has been powerless. This phenomenon is called the growth of the character.

The ability of the character is not only improved but also reduced in accordance with the action. Therefore, if the player is unskilled in the game, the character is often defeated by the enemies before the character grows sufficiently, whereby the game is over.

If the player challenges the game repeatedly and gets skilled in the content of the game, he gradually becomes capable of achieving the aim of the game (the final object such as finding the treasure and rescuing the captured princess). In this way, the player can play the game while enjoying the growth of the character.

In such a game, the player is required to enhance the ability of the character while repeating trials and errors, as described above. Such games are therefore suitable as home video games.

The most important requisition for a home video game, however, is to be cheap. For this reason, such a home video game is often lacking in the beauty of the image, the speed of the image change and the elaborateness of the game story, so that it is difficult to provide a home video game which adequately satisfies the player.

In contrast, if such an ability setting type game is provided as a commercial video game, it is possible to solve the above-described problems in a home video game and the content of the game will be satisfactory to the player.

On the other hand, this type of game requires to a certain degree of trial and error for getting skilled in the content of the game. If such a game is played on a commercial video game machine, it therefore takes the player too much time and money. Accordingly, the development of a system has been demanded which enables the player to enjoy a commercial video game in the necessary shortest time and with the smallest money.

SUMMARY OF THE INVENTION

Accordingly, it is an object of the present invention to eliminate the above-described problems in the prior art and to provide a game system which prepares a commercial video game of a higher grade than that of a home video game by expanding the content of the home video game so that the commercial video game is capable of accepting a challenge of the player with a character having the ability enhanced in the home video game, thereby giving more satisfaction to the player.

To achieve this aim, the system according to the present invention comprises:

a home video machine in which a game is played and the ability of a character which appears in the game is calculated and set with the progress of the game in accordance with a predetermined home game program; and a commercial video game machine in which a game is played in a commercial game space of a higher grade than that of the home game space and the ability of a character which appears in the game is calculated and set with the progress of the game in accordance with a commercial game program for playing a commercial game which is produced by expanding the home game;

the home video game machine including means for externally outputting the ability of the character at the time of suspension of the game; and the commercial video game machine including means for inputting the ability of the character which has been output from the home video game machine at the time of suspension of the game as the initial ability data of the character which appears in the commercial video game.

According to the present invention, it is possible to input the ability of the character which has been grown as a result of trial and error in the home video game machine to the commercial video game machine as the initial ability data of the character and to play the game in the commercial game space of a higher grade than that of the home game space.

Thus, it is possible to play an ability setting type game, which has hitherto been played only in the limited home game space and has not provided sufficient pleasure, in a commercial game space of a higher grade than that of the home game space, thereby increasing the pleasure of the game.

According to the present invention, it is possible to practice the game sufficiently in the home video game so as to set the ability of the character which appears in the game in a sufficiently high state, and thereafter to challenge the commercial video game repeatedly.

Consequently, even if the player gets unsatisfied with the home video game, it is possible to utilize the home video game as a training game for the commercial video game, thereby increasing the utility value of the home video game.

Furthermore, if the commercial video game machine is so designed that the abilities of the characters which have been calculated and set in the respective home video games by a plurality of players can be separately input as the respective initial ability data prior to the start of the commercial video game, it is possible to play the game not only by a single player but also by a plurality of players while using the characters having the abilities grown by the respective players simultaneously in the commercial game space, thereby increasing the pleasure of the game.

The above and other objects, features and advantages of the present invention will become clear from the following description of the preferred embodiments thereof, taken in conjunction with the accompanying drawings.

BRIEF DESCRIPTION OF THE DRAWINGS

FIG. 4 is an explanatory view of the ability data of the game shown in FIG. 3;

DESCRIPTION OF THE PREFERRED EMBODIMENTS

Preferred embodiments of the present invention will be explained with reference to the accompanying drawings.

First Embodiment

Structure of the system

Figure 1:
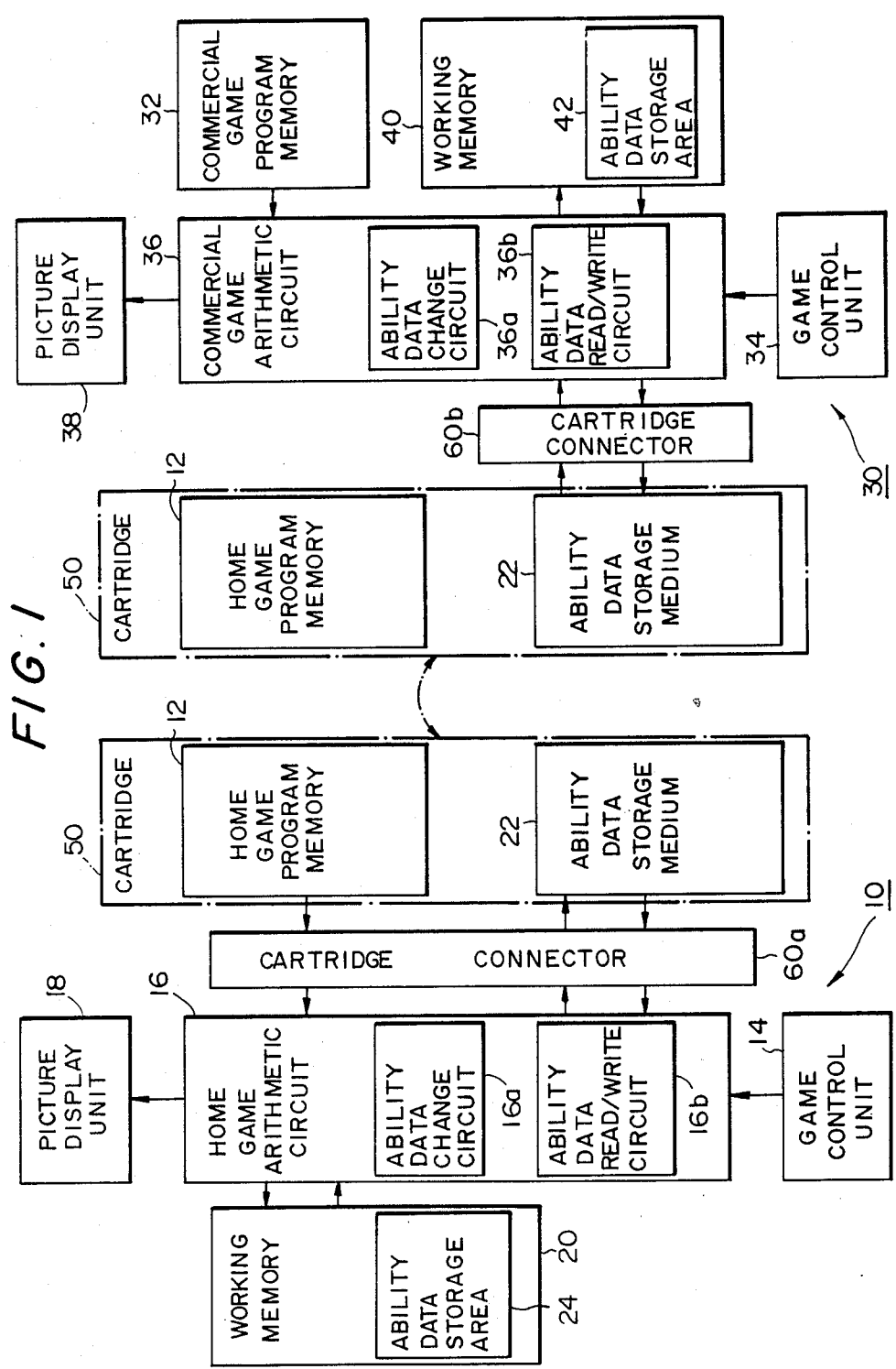
FIG. 1 is a block diagram of a preferred embodiment of a game system according to the present invention.

FIG. 1 shows a preferred embodiment of a video game system according to the present invention. The video system of this embodiment is composed of a home video game machine 10 and a commercial video machine 30.

Home video game machine

The home video game machine 10 is composed of a home game program memory 12, a game control unit 14, home game arithmetic unit 16, a picture display unit 18, a working memory 20 and an ability data storage medium 22.

The home game arithmetic unit 16 is provided therein with an ability data change circuit 16$a$ and an ability data read/write circuit 16$b$. The working memory 20 is provided therein with an ability data storage area 24. The home game program memory 12 and the ability data storage medium 22 are incorporated into a cartridge 50. The cartridge 50 is removably mounted on a cartridge connector (e.g., socket) 60$a$ which is attached to the game machine body.

The home video game machine 10 both executes a predetermined calculation and automatically calculates the ability of a character which appears in the game with the progress of the game in accordance with a home game program.

More specifically, in the home game program memory 12 a home game program of an ability setting type is registered in advance. When the player operates the game control unit 14 to start the game, the home game arithmetic unit 16 computes the game picture in accordance with the game program registered in the program memory 12 in advance, and displays the computed game picture by the picture display unit 18.

The ability data change circuit 16$a$ in the home video game arithmetic circuit 16 automatically calculates the ability of the character who appears on the game picture and writes the calculated ability data into the ability data storage area 24 in the working memory 20.

Figure 10:
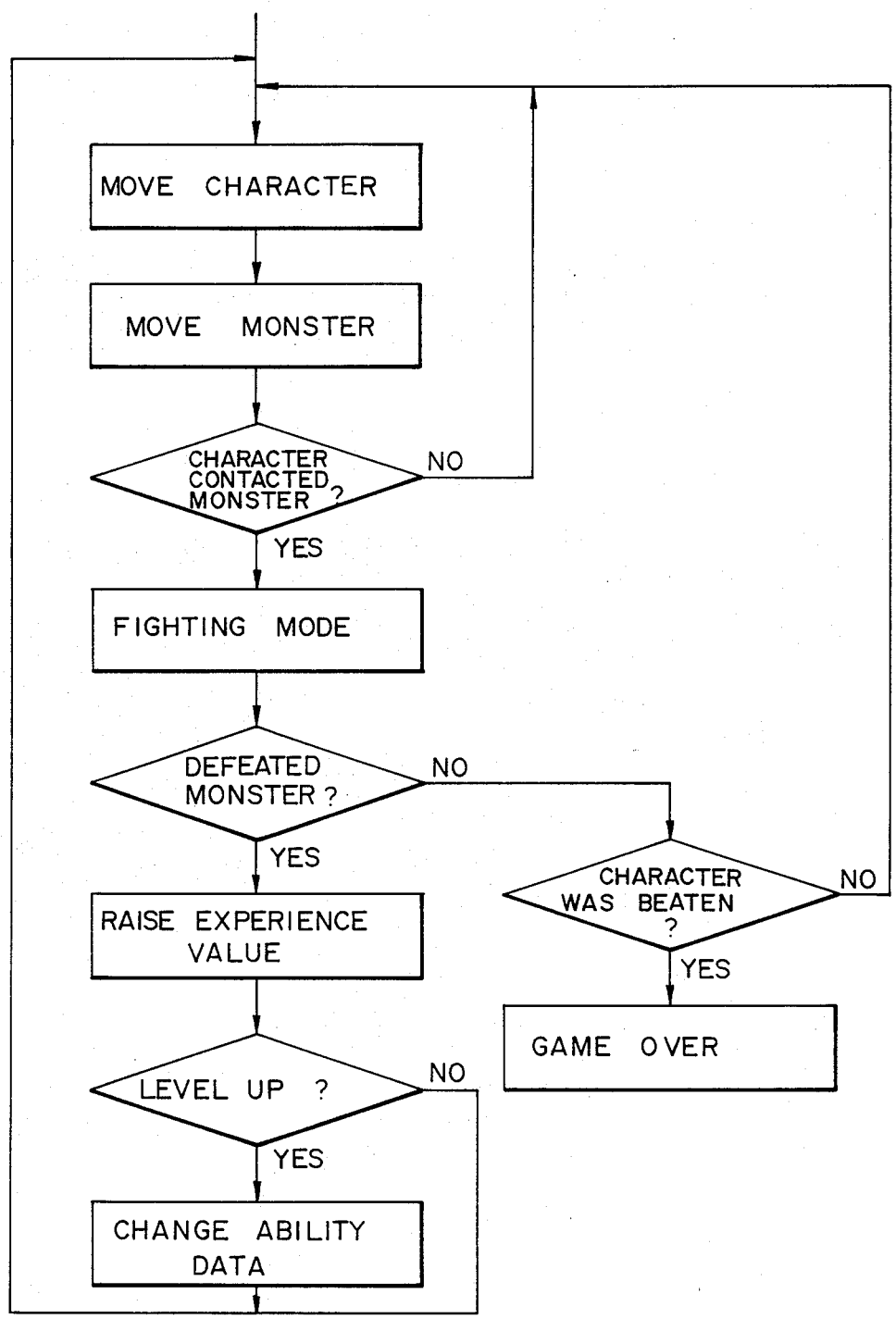

FIG. 10 is a flow chart of an example of operation of the ability data change circuit 16$a$ in this embodiment. As shown in FIG. 10, the ability data change circuit 16$a$ judges whether or not the character operated by the player and an enemy monster which appears on the game picture have met each other by seeing the actions of the monster and the character. If both have met, for example, the game takes the fighting mode, and whether or not the character of the player has defeated the enemy monster is judged. If the monster has been defeated, the experience value which has been set for each monster is added to the current experience value of the player. Judgement is then made as to whether or not the thus-obtained experience value exceeds the experience value set for each level. If the answer is yes, the ability data of the character is raised by a predetermined amount, and the data stored in the ability data storage area 24 is renewed.

In some cases, the ability data may be reduced by a predetermined penalty (not shown). The data in the ability data storage area 24 is also renewed in this case.

The game may be so designed that when the character operated by the player is completely defeated, the game is over.

It goes without saying that the way to develop the game and the way to calculate the data are different depending upon the content of the game.

In this way, in the home video game machine 10, the ability of the character which appears in the game is successively changed with the development of the game and, hence, the ability data written into the ability data storage area 24 is successively renewed.

Figure 9:
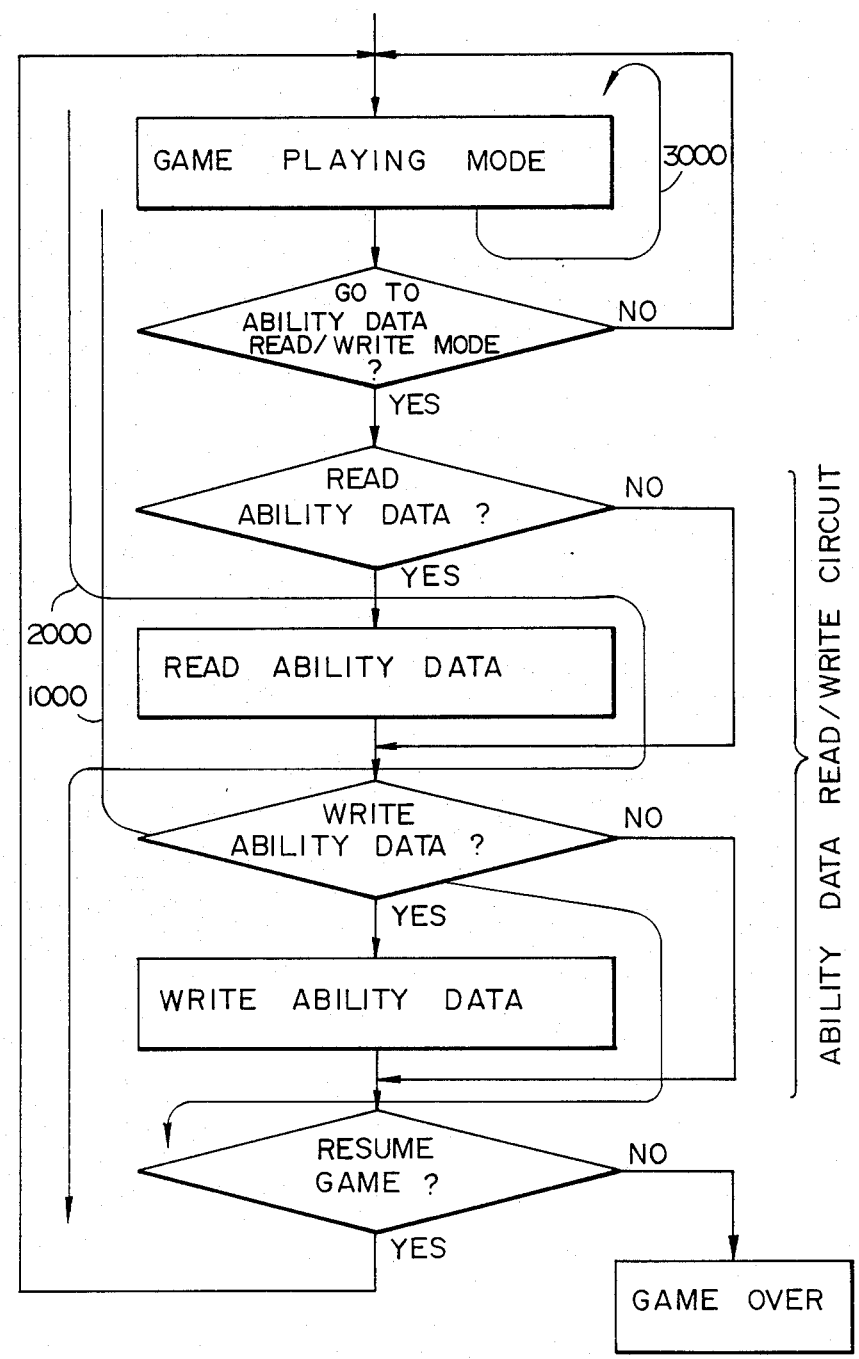
FIGS. 9 and 10 are flow charts of examples of operations of the ability data write/read circuit and the ability data change circuit, respectively.

FIG. 9 is a flow chart of an example of operation of the ability data read/write circuit 16$b$ in this embodiment.

The ability data read/write circuit 16$b$ is operated in accordance with a flow 1000 at the time of start or resumption of the game, in accordance with a flow 3000 during the game, and in accordance with a flow 2000 at the suspension of the game.

Therefore, in the home video game machine 10, when the player inputs a game suspension signal from the game control unit 14, the ability data read/write circuit 16$b$ operates in accordance with the flow 2000 and writes the character ability data which has been written in the ability data storage area 24 into the ability data storage medium 22 of the cartridge 50. In this way, the character ability data at the time of suspension of the game is automatically written into the ability data storage medium 22.

In this embodiment, the cartridge 50 is an RAM cartridge which is removably mounted on the game machine body through the cartridge connector 60a. The RAM cartridge has a built-in backup battery so that even if the power source of the game machine 10 is turned off, the stored content is not erased.

Consequently, if the cartridge 50 is mounted on the cartridge connector 60a of the home video game machined 10 and a predetermined ability setting type game is played and suspended, the ability data of the character at the time of the suspension of the game is automatically written and stored into the ability data storage medium 22 and the written ability data is retained without being erased even if the power source of the home video game machine 10 is turned off.

Commercial video game machine

The commercial video game machine 30 in this embodiment is composed of a commercial game program memory 32, a game control unit 34, a commercial game arithmetic circuit 36, a picture display unit 38 and a working memory 40.

The working memory 40 is provided therein with an ability data storage area 42. The commercial game arithmetic circuit 36 is provided therein with an ability data change circuit 36a which is operated in accordance with the flow shown in FIG. 10, and an ability data read/write circuit 36b which is operated in accordance with the flow shown in FIG. 9. A cartridge connector 60b such as a socket is provided on the main body of the commercial video game machine 30. The cartridge 50 provided on the home video game machine 10 can be freely mounted on and removed from the cartridge connector 60b.

When the cartridge 50 is mounted on the cartridge connector 60b of the commercial video game machine 30 to start a commercial video game, the character ability data calculated and set by the home video game machine 10 is input as an initial ability data of a character which appears in the commercial video game.

In the program memory 32, a commercial game program which is capable of creating a commercial game space of a higher grade than that of the home game space by expanding the home game program is registered in advance.

The game control unit 34 has a higher operability than that of the control unit 14 of the home video game machine 10, and provides realism for the player in accordance with the content of the game; in a drive game, for example, the game control unit 34 is provided with a steering wheel, an accelerator, a brake, a shift lever, etc.

The commercial game arithmetic circuit 36 reads the ability data of the character which is written in the ability data storage medium 22 of the cartridge 50 mounted on the cartridge connector 60b as the initial ability data of the character which appears in the commercial video game by the ability data read/write circuit 36b. The thus-read initial ability data is written into the ability data storage area 42 in the working memory 40. The commercial game arithmetic unit 36 computes the content of the game on the basis of the commercial game program stored in the commercial game program memory 32 and the game signal input from the game control unit 34, and displays the game picture by means of the picture display unit 38.

The ability data change circuit 36a in the game arithmetic circuit 36 successively calculates the ability of the character which appears in the game and changes with the development of the game in accordance with the flow shown in FIG. 10, and successively renews the ability data stored in the ability data storage area 42. Therefore, the latest ability data is constantly written into the ability data storage area 42, and the commercial game arithmetic circuit 36 computes the content of the game by using the ability data written in the storage area 42.

When the player inputs a game suspension signal from the game control unit 34 or the game time preset in the commercial video game machine 30 is up, the commercial game arithmetic circuit 36 automatically suspends the game. At this time, the ability data read/write circuit 36b writes the ability data of the character at the time of suspension of the game which is written in the ability data storage area 42 into the ability data storage medium 22 in the cartridge 50.

The player can therefore remove the cartridge 50 from the cartridge connector 60b of the commercial video game 30 and take it home. The player can use the character ability data at the time of suspension of the commercial video game as the initial character ability data for the home video game by mounting the cartridge 50 on the cartridge connector 60a of the home video game machine 10.

When the cartridge 50 is mounted on the cartridge connector 60a to start the game in this way, the home video game machine 10 reads the ability data of the character which is stored in the ability data storage medium 22 by the ability data read/write circuit 16b, and writes the read data into the ability data storage area 24 as the initial ability data. In this way, the home video game machine 10 can use the character ability data at the time of suspension of the commercial video game as the character ability data for the home video game.

Additionally, in the system of this embodiment, it is preferable that the commercial video game machine 30 is so designed that the game can be played in accordance with the the commercial game program without mounting the cartridge 50 thereon. In this case, the initial ability data of a character is provided by the commercial game program.

System for a plurality of players

Figure 2:
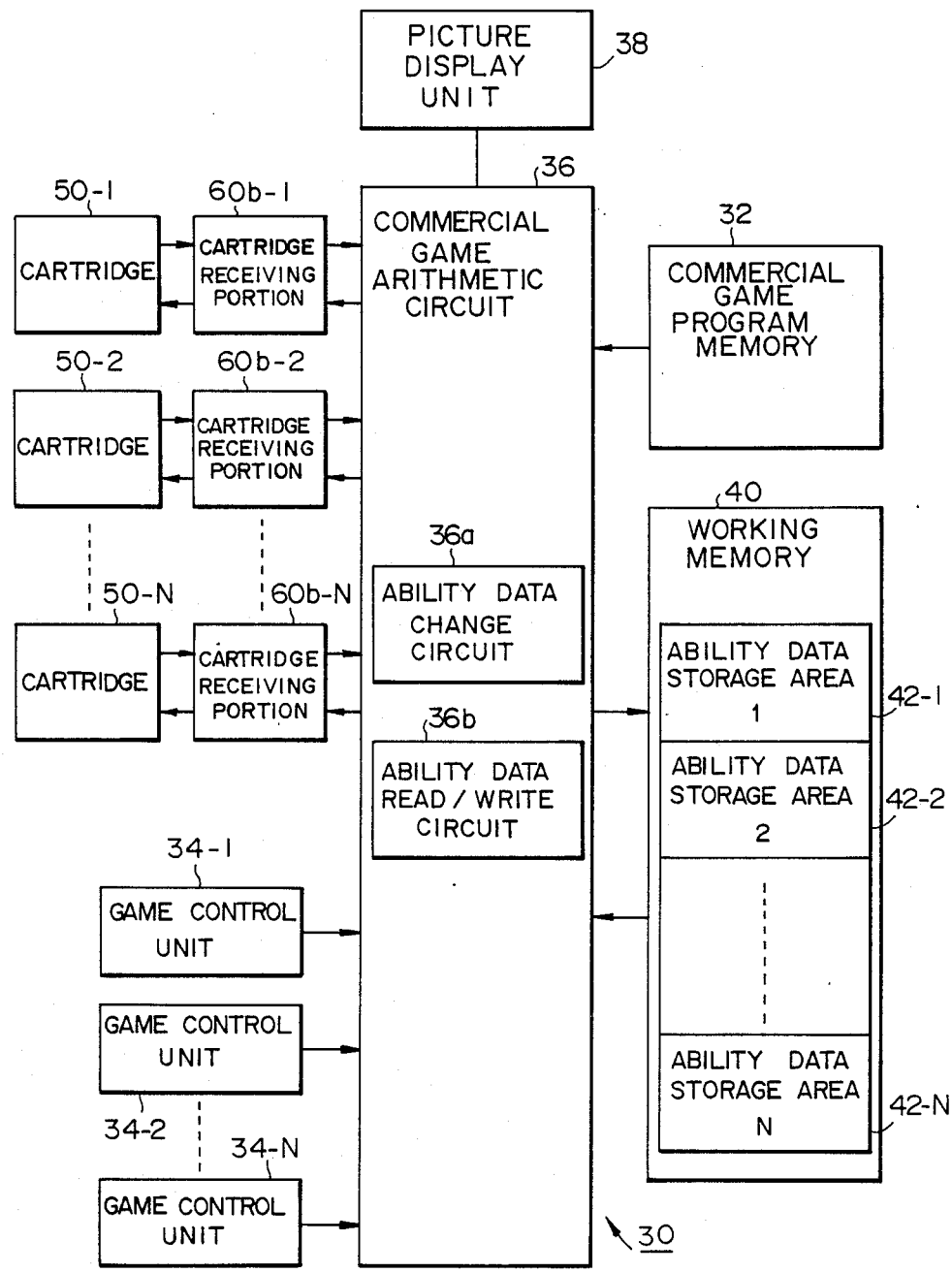
FIG. 2 is a block diagram of another example of a commercial video game machine used for the system shown in FIG. 1.

A plurality of game control units 34-1, 34-2, ... 34-N may be provided in the commercial video game machine so that a plurality of players can operate the characters corresponding to the control units 34-1, 34-2, ... 34-N, as shown in FIG. 2. In this case, a plurality of cartridge connectors 60-1, 60-2, ... 60-N for receiving a plurality of cartridges 50-1, 50-2, ... 50-N corresponding to the control units 34-1, 34-2, ... 34-N, respectively, are provided on the game machine body, and a plurality of ability data storage areas 42-1, 42-2, ... 42-N corresponding to the respective control units are provided in the working memory 40.

Examples of adaptation of the system

The system of this embodiment has the above-described structure. The examples of adaptation of the system will be explained in the following.

(a) Role playing game

The system of this embodiment is adaptable to a role playing game.

The original meaning of a role playing game is a game in which a predetermined role is played in a game space in which a fancy or the reality is simulated. For example, the player develops the game while playing a role of a salaried man or a president in the real world or a medieval knight or a prince in a magic land in a fantastic world.

Figure 3:
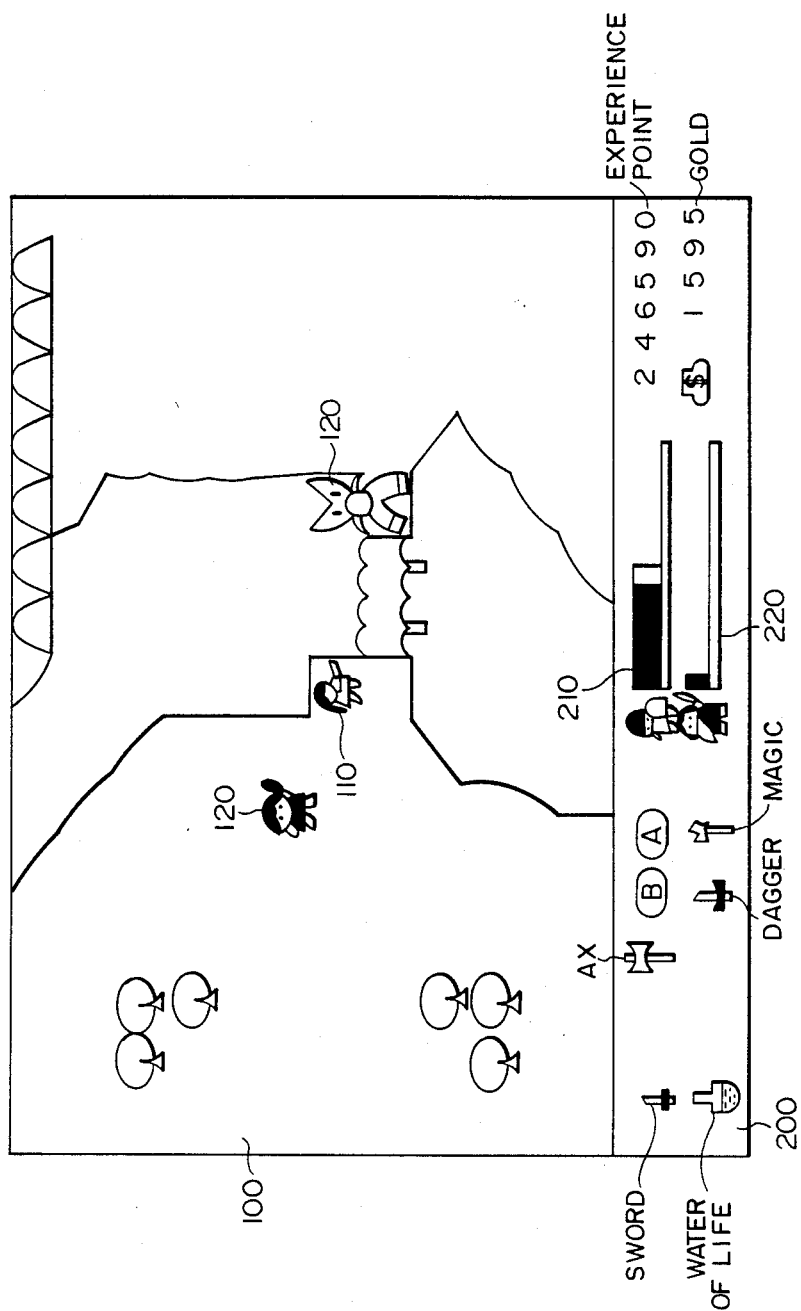
FIG. 3 is an explanatory view of an example of the pictures of an ability setting type role playing game played using the system shown in FIG. 1.

FIG. 3 shows an example of the game pictures of a role playing game. The game picture consists of a game space display area 100 and an ability data display area 200.

In this example, a home game program having a story that a hero, which is a woman warrior "Valkyrie" 110, defeats various kinds of monsters 120 and finally defeats Satan, thereby procuring the key of time and regaining the peace of the island is registered in the program memory 12 of the home video game machine 10.

In the program memory 32 of the commercial video game machine 30, the commercial game program for playing a commercial game which is produced by expanding the home game is registered. In this example, the commercial game program has a story that Satan considered to be defeated in the home game program is a sham, and the woman warrior "Valkyrie" starts on a new journey to defeat the real Satan which lives in the land adjacent to the island to which peace has been brought back.

The player first sets the memory 12 in which the home game program of "Adventure of Valkyrie" is registered on the home video game machine 10 to play the game. Prior to the start of the game, the player creates a character who takes an active part in the game space, namely, the woman warrior "Valkyrie" in this case.

When the character is created in this way, the ability of the character is automatically determined. For example, if the woman warrior "Valkyrie" is created, the character ability consisting of the power and items such as those shown in FIG. 4 is automatically determined.

In this example, the power of the character is composed of physical strength (representing the strength of the force), intellect (intelligence, a factor which influences on the degree of learning magic), life force (represented by the life force barometer 210 of the heroin and the life force barometer 220 of the monster in FIG. 3, and without this the character would die), agility and so forth. The items are composed of an experience point, gold coins (money for buying various equipments), equipments (personal effects of the character such as a dagger, an armor and magic water for healing a wound), etc.

Such an ability value is not fixed and changes in accordance with the action of the character. For example, when "Valkyrie" defeats a monster, an experience point is given, and if the experience point reaches a predetermined point, the ability value is increased, which phenomenon is called "level-up".

In this case, if the physical strength is increased, the character can easily defeat the monster to which she has hitherto been powerless, and if the intellect is increased, the character can learn magic which she has hitherto unknown or the number of times at which the character is allowed to use magic is increased.

If the character defeats a monster which has a gold coin, the number of gold coins is increased. It is possible to buy various equipments such as arms and protectors with the gold coins, and the offensive power and the defensive strength are increased by putting on the thus-obtained arms and protectors.

In this manner, the player achieves the aim of the game, namely, enhances the ability of the character by operating her in accordance with the development of the game so that she regains the peace of the island by defeating various monsters one by one, finally Satan, and procuring the key of time.

When the home video game is played in this way, the ability data of the character who takes an active part in the game, namely, the woman warrior "Valkyrie" in this case, is successively stored in the ability data storage medium 22. When the game is suspended, the ability data is automatically written from the ability data storage area 24 into the ability data storage medium 22. Therefore, the player can create the character which has sufficiently grown up by using the home video game. It is possible to remove the cartridge 50 in which the ability data is stored from the home video game machine 10 and to mount it on the commercial video game machine 30 installed in a game house, for example, to start the commercial video game.

At this time, the ability of the character grown in the home game is input as the initial ability data of the character who appears in the home video game. Consequently, the player can play the commercial video game by presenting the character having the ability grown by the player in the commercial game space of a higher grade than that of the home game space, thereby enjoying greater pleasure of the game.

Figure 5B:
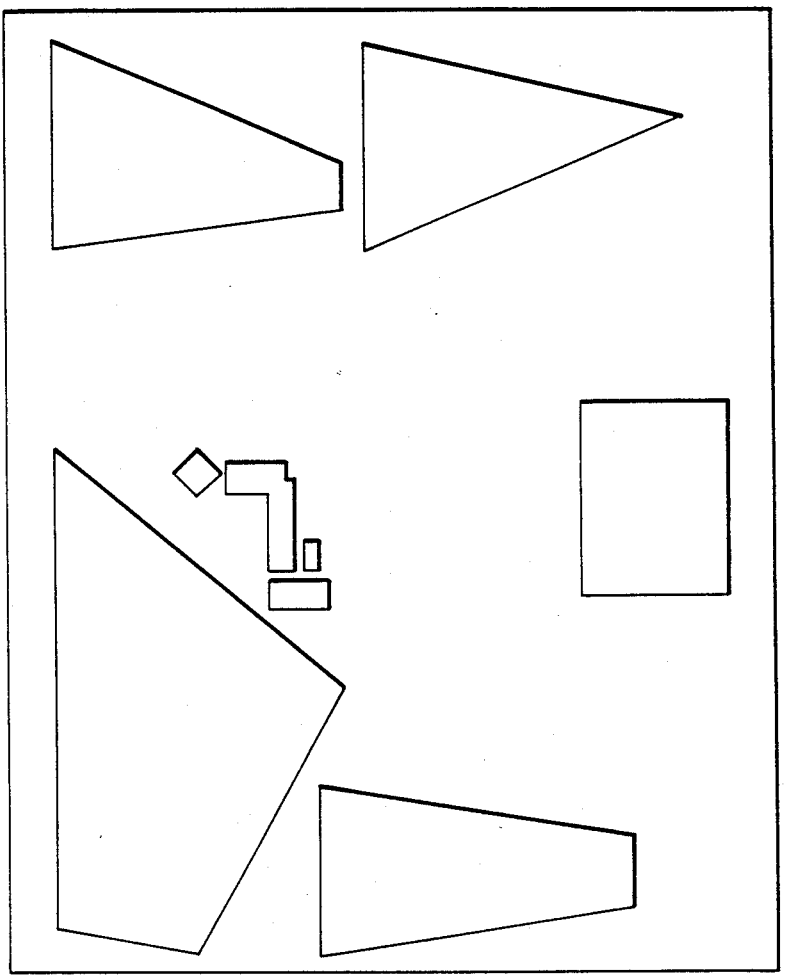
FIG. 5($a$) and 5($b$) are an explanatory view of the difference in the space area of a commercial video game and a home video game.
Figure 5A:
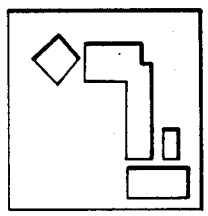

For example, even when the home game program can set only Japanese territory as a game space, as shown in FIG. 5(A), the commercial game program can set, for example, the whole world on the earth as a game space, as shown in FIG. 5(B), because the memory 32 has a sufficient capacity. The player can therefore enjoy the eventful game with the character appearing in the commercial game space of a higher grade than that of the home game space.

Furthermore, in the commercial video game, the picture displayed on the screen is generally finer and more beautiful than that of the home video game, and since the commercial video game is capable of producing a visual effect which cannot be obtained by the home video game by subjecting the machine itself to a special treatment, it is possible to enhance the realism of the game itself.

Since the commercial video game is not much restricted in the cost in comparison with the home game, it is possible to give variety to the game story and to present items and monsters which are not in the home video game so as to make the game more interesting than the home game.

According to the present invention, the commercial game has a wider game space and more varied game story than the home game. For this reason, it is possible to experience the pleasure of the commercial game which cannot be obtained from the home game by challenging the commercial video game repeatedly with the character grown in the home game.

Even when the player is tired of the home game, the home game can be utilized as a training game for the commercial video game of a higher grade than that of the home game.

According to the present invention, when the content of the commercial video game is too complicated for the player to challenge it first, the player can practice the home game sufficiently to realize the content of the commercial game. Thus, the player can adequately enjoy the pleasure of the commercial video game in the game house in the necessary shortest time.

If the commercial video game machine 30 is constructed as shown in FIG. 2, a plurality of players can play the game simultaneously by presenting the characters having the abilities grown by the respective players in the same game space so as to explore the same world, thereby enhancing the pleasure of the game. In this case, the game may be so designed that the character of one player is Valkyrie, and the character of another player is a friend or a brother of Valkyrie.

When the commercial video game is suspended, the ability data of the character at the time of suspension of the game is automatically stored in the ability data storage medium 22 of the cartridge 50. Therefore, it is possible to take the cartridge 50 home and mount it on the home video game machine 10 to resume the home game and to enhance or change the ability of the character.

(b) Simulation game

A role playing game adopting the system shown in FIG. 1 is explained in this embodiment, but the present invention is not restricted thereto and various simulation games such as a base ball game can adopt this system.

For example, a baseball game program is so designed that the batting average, defensive power, running power, fatigue degree, pitching power (speed, kinds of screwballs, amount of deviation, earned run average, earned home run average), etc. of the players of each team are expressed numerically and changed with the progress of the game. In such a baseball game, the batting average of a batter who does not hit a ball is reduced, so that his probability of hitting is also reduced. If a batter has a high batting average, his probability of hitting is naturally high, but since the opposing team is cautious, the probability of hitting is not always high.

The game program incorporate the individuality of each player. For example, one fourth batter does not make a hit at a good opportunity, and one pitcher is apt to serve up a homer even if he is in a very good condition. The player can therefore consider a change of the batting order, the time for changing pitchers, or the rotation of the pitchers in successive games.

In the case of playing such a baseball game by using the game system of this embodiment, practice games are played in the home game while considering the operating method and tactics to make a strong team with each player having his ability enhanced. Thereafter, a regular game is played in the commercial video game. It is also possible that two players play a regular game by the two teams trained by the respective players in the home video games. When a predetermined number of games are played, the percentages of victories are shown and the names of the teams with a good result are displayed on the screen, which encourages the player and increases the pleasure of the game itself.

It is also possible to make a plurality of leagues of different levels such as a little league, high-school baseball league, non-professional league, professional league and a world title league, and raise or lower the league to which the team belongs in accordance with the result of the games in the commercial video game.

It is also possible to hold an all-Japan baseball tournament for each level as an event. For example, if the game program enables the storage of the team name and the like together with the ability data, the player can name the team after the team name of his alma mater, win all the games in a local tournament, and take part in an all-Japan high-school baseball tournament. To lead the team of his alma mater, win all the games in a local tournament and take part in an all-Japan high-school baseball tournament will be irresistibly attractive to a high-school baseball fan.

(c) Drive game

The system of this embodiment is also adaptable to a drive game in the home video game machine 10 and the commercial video game machine 30.

As such a drive game, a program will be considered which provides a story, for example, that a racer takes part in a race in a car designed by the racer within a limited price, and wins a prize when he is a high-ranking racer, and designs a car of a higher grade with the obtained money.

Figure 6A:
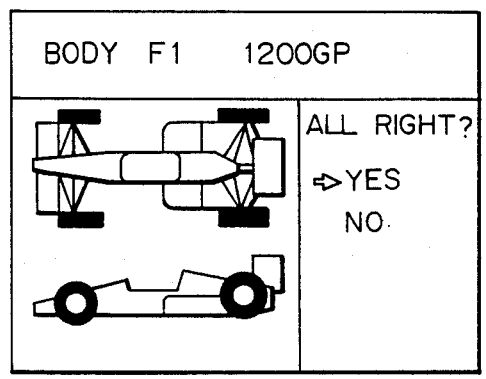
FIG. 6($a$), 6($b$) and 6($c$) show examples of the pictures of a drive game.

In this case, in the home game, a car is designed within a limited price and the designed car can run several test courses on trial. For example, a body, suspension, steering wheel, engine, tire, the capacity of a fuel tank, etc. may be selected as desired in accordance with the price, and an original car such as that shown in FIG. 6(A) is designed by the player. It is therefore possible to select, for example, a body which is light so as to enable speedup or a body which is heavy but tough. It is also possible to select various kinds of tires in accordance with the road surface. The selection of the capacity of the fuel tank makes an influence on the result of a race. For example, if the capacity of the fuel tank is large, refueling operation is dispensed with but acceleration is inferior. On the other hand, if the capacity is small, acceleration is improved but the number of refueling times is inconveniently increased.

Figure 6B:
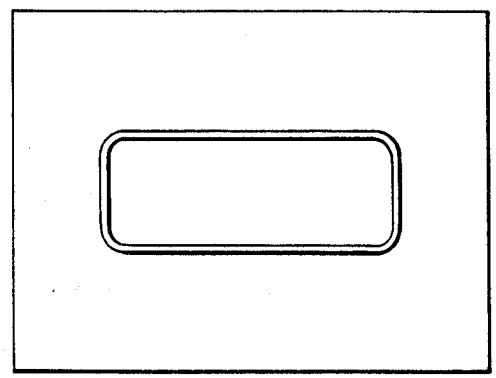

The original car designed in this way is caused to run various kinds of test courses incorporated into the home game program such as that shown in FIG. 6(B), e.g., a simple course consisting of a straight line, a simple circuit course and complicated courses including a hairpin bend and a chicane, and the speed is timed.

If a good time is not obtained, the car design is changed. The design of a car will be not the same with all players, because a player having a good reflective power will design a light and fast car, while a player having no confidence in the reflective power will design a tough car which will no be crushed when it hits against another car. Since the optimum design is different depending upon the course, the design once determined is not final.

When a car of the best mode is designed in this manner in the home game, the ability data of the designed car is written into the working memory 20.

The player removes the cartridge 50 in which the ability data is written from the home video game machine 10 and sets it on the commercial video game machine 30 installed in a game house, for example.

Figure 6C:
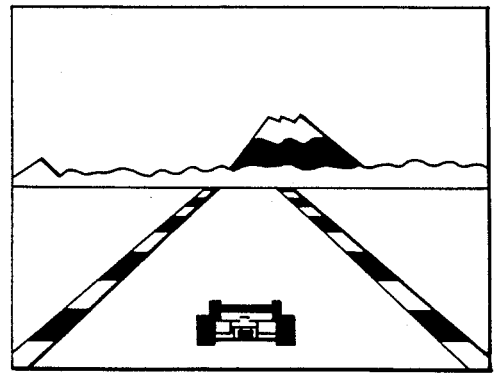

In the commercial video game machine 30, a game program such as a Grand Prix race is registered in the program memory 32. The player can take part in the Grand Prix race in the car designed by himself to compete for the first place, as shown in FIG. 6(C). At this time, the starting position in the Grand Prix race is different depending upon the course time obtained in the home game. If the time is good, the player can take the pole position.

If the result of the Grand Prix race is good, the prize is provided and it is written in the ability data storage medium 22 of the cartridge 50 as the ability data.

The player can therefore remove the cartridge 50 from the commercial video game machine 30 after the suspension of the Grand Prix race and mount it on the home video game machine 10. The player can improve the car with the prize he has won and challenge again the Grand Prix race in the commercial video game to aim at a higher ranking.

If the result of the Grand Prix race is bad, the player can change the design of the car in the home game to challenge again the Grand Prix race.

By using the system of this embodiment for such a car racing game, the player can enjoy the pleasure of the game in the necessary shortest time in a game house without the need for designing the car in the commercial video game.

Furthermore, if such a drive game is played in the home game, since the game control unit 14 does not correspond to the steering wheel, clutch or the shift gears of the actual car, the game is lacking in realism. In contrast, if the commercial drive game is prepared by expanding the home video game, it is possible to design the game control unit 34 so that the player can sit on the seat and operate the steering wheel, accelerator, brake, and shift lever in the same way as in the actual car, thereby enhancing the realism in correspondence with the content of the game.

In addition, in the commercial video game, it is possible to make a finer and more beautiful displayed picture in comparison with the home video game, and improve the sound effect by using 4-channel stereo or the like. It is further possible to move the seat on which the player is sitting to reproduce the vibration of the actual car, thereby also enhancing the realism of the drive game in this respect.

Since it is possible to take a sufficiently large capacity for the program memory 32, the difference in the weather condition such as rain and snow and a course with ups and downs can be produced, thereby making the game more varied.

If a plurality of commercial video games are connected in a network, a plurality of players can take part in the Grand Prix race simultaneously and compete with each other, so that it is possible for each player to compete with another in the performance of the car designed by himself and the driving technique, thereby further enhancing the pleasure of the game.

Second embodiment

Figure 7:
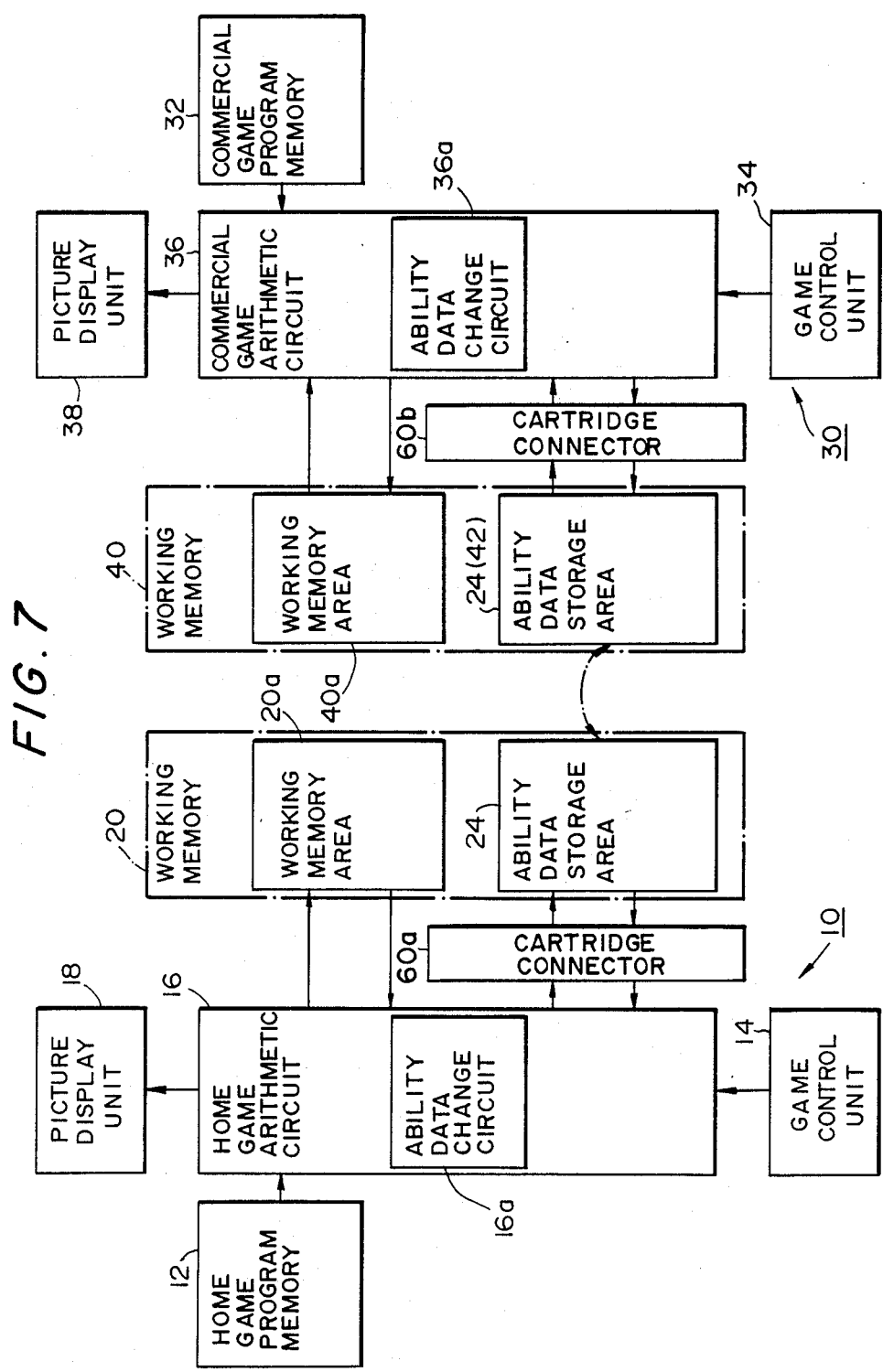
FIGS. 7 and 8 are block diagrams of other embodiments of a game system according to the present invention.

FIG. 7 shows a second embodiment of a game system according to the present invention.

In the first embodiment, the ability data of the character stored in the ability data storage areas 24 and 42 of the working memories 20 and 40 are written into the ability data storage medium 22 of the cartridge 50 by using the ability data read/write circuits 16b and 36b every time the game is suspended and the cartridge 50 itself which accommodates the storage medium 22 is removably provided on the game machine bodies.

In contrast, the second embodiment is characterized in that the ability data storage medium 22 is eliminated and the ability data storage area 24 itself which is provided as the memory portion of the working memories 20 and 40 is freely mounted on and removed from the game machine bodies 10 and 30 through the cartridge connectors 60a and 60b, respectively.

In this embodiment, the working memory 20 used for the home video game machine 10 is composed of the ability data storage area 24 which is freely mounted on and removed from the game machine body 10 through the cartridge connector 60a and a working memory area 20a which is accommodated in the game machine body. The ability data storage area 24 is constituted as an RAM cartridge backed up by a battery.

The working memory 40 used for the commercial video game machine 30 is composed of the ability data storage area 24 which is freely mounted on and removed from the game machine body 30 through the cartridge connector 60b and a working memory area 40a which is accommodated in the game machine body.

The system of this embodiment having the above-described structure enables various games to be played in the same way as the embodiment shown in FIG. 1 by mounting the common ability data storage area 24 on the home video game machine 10 or the commercial video game machine 30 or removing it therefrom.

In the system of this embodiment, since it is not necessary to provide the ability data read/write circuits 16b and 36b in the game arithmetic circuits 16 and 36, respectively, and to provide a special memory such as the ability data storage medium 22, it is possible to simplify the structure of the machine as a whole to that extent in comparison with the embodiment shown in FIG. 1.

In the system of this embodiment, it is also possible to constitute the commercial video game machine 30 so as to correspond to the machine shown in FIG. 2. In this case, prior to start of the game, each of a plurality of players mounts the ability data storage area 24 on the game machine 30 so as to input the ability data of the character operated by each player as the initial ability data.

In the system of this embodiment, it is also preferable to removably provide the program memory 12 on the main body of the home video game machine 10 so that various games are enjoyed in the same home video game machine 10.

Figure 11:
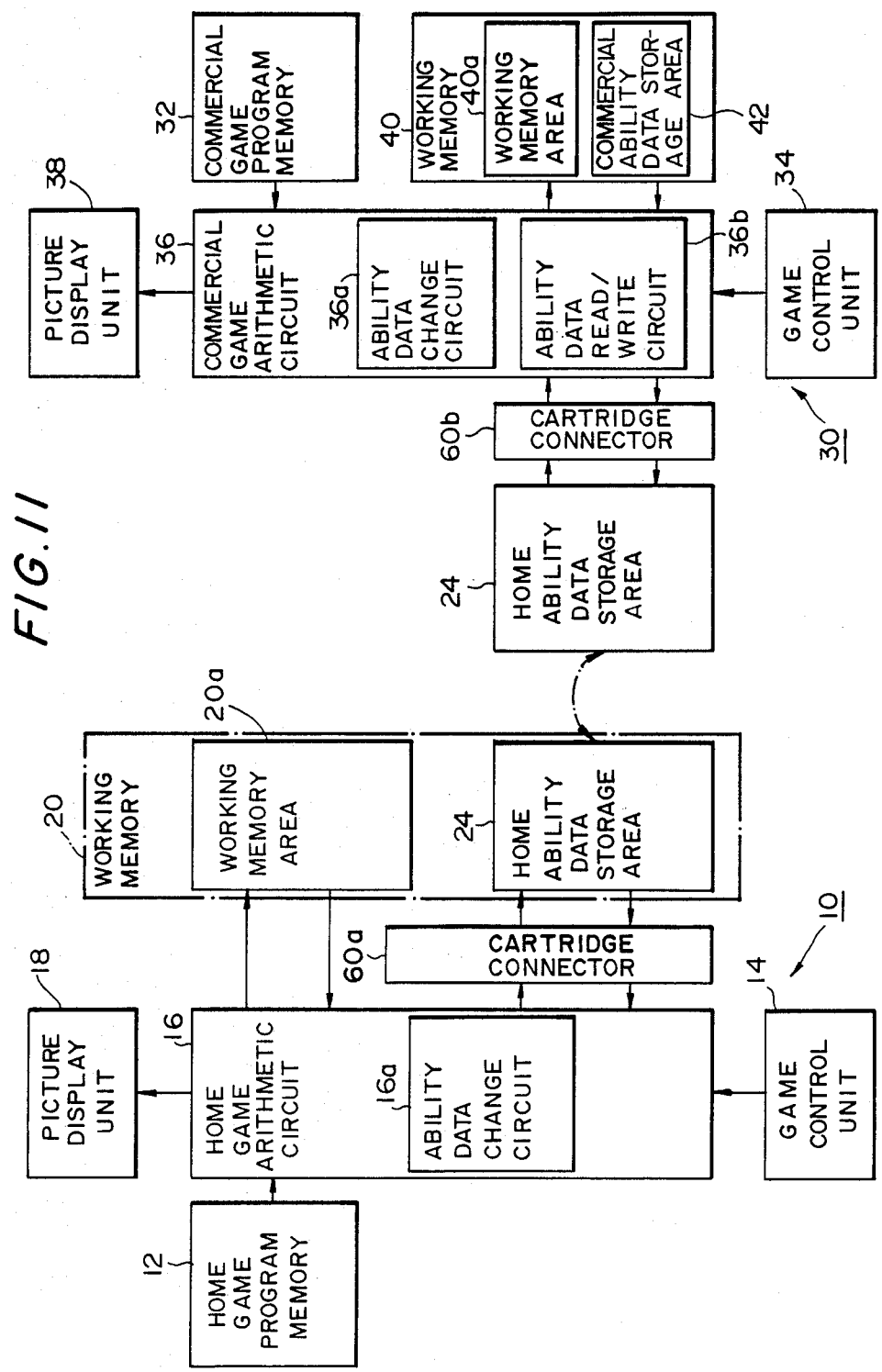
FIG. 11 is an explanatory view of another example of game machines used for the system shown in FIG. 7.

In this embodiment, the working memory 40 of the commercial video game machine 30 is so designed that the ability data storage area 24 mounted on the cartridge connector 60b and the working memory area 40a functions as one working memory area, as shown in FIG. 7. However, the present invention is not restricted thereto. For example, the commercial ability data storage area 42 and the working memory area 40a may be provided in the commercial working memory 40, as shown in FIG. 11. This structure makes it possible to play the game by using the commercial ability data storage area 42 provided in the working memory 40 while the home ability data storage area 24 is not on the cartridge connector 60b, and to play the game by using the home ability data storage area 24 when the ability data storage area 24 is mounted on the cartridge connector 60b.

In the case where the commercial ability data storage area 42 is provided in the working memory, as shown in FIG. 11, it is also possible to read the ability data of the character written in the home ability data storage area 24 and write it into the commercial ability data storage area 42 by the ability data read/write circuit 36b as the initial ability data of the character who appears in the commercial video game in the same way as in the first embodiment shown in FIG. 1. In this case, the system is preferably so constituted that when the commercial video game is suspended, the ability data of the character stored in the commercial ability data storage area 42 is read and written into the home ability data storage area 24 by the ability data read/write circuit 36b.

Third embodiment

Figure 8:
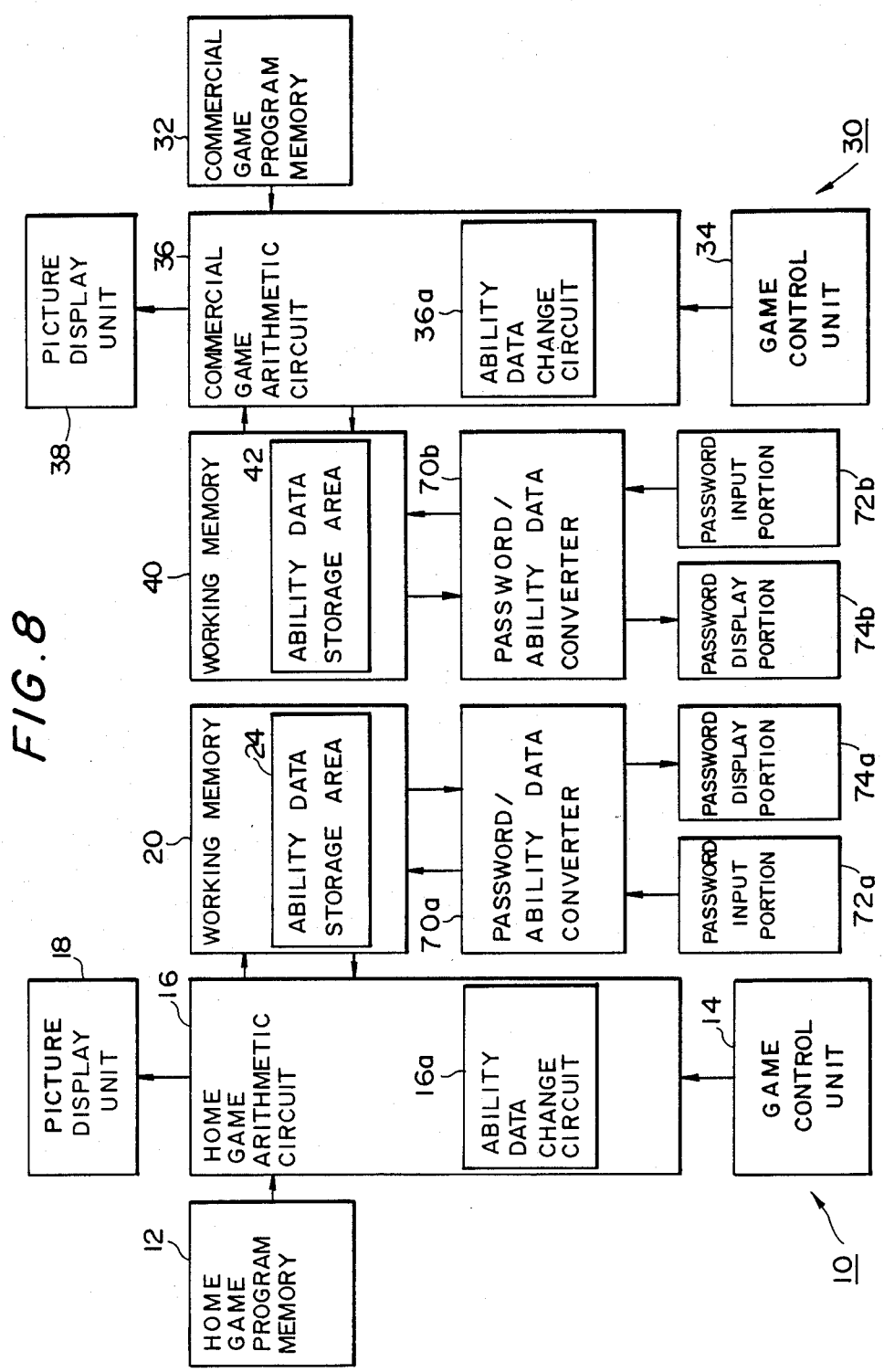

FIG. 8 shows a third embodiment of a game system according to the present invention. In this system, the ability data of various characters stored in the ability data storage areas 24 and 42 are displayed on password display portions 74a and 74b, respectively, through converters 70a and 70b, respectively.

Furthermore, the displayed passwords are input through password input portions 72a and 72b, and the input passwords are converted into respective ability data by the converters 70a and 70b, respectively, and written into the corresponding ability data storage areas 24 and 42.

This structure dispenses with the need for carrying the cartridge 50 or the ability data storage area 24 unlike the systems shown in FIGS. 1 and 7, and all the player has to do is remember the displayed passwords and input them through the password input portions 72a and 72b.

As such a password, for example, an alphabet, numerals and other marks and figures are usable.

By using a system consisting of such password type home video game machine 10 and commercial video game machine 30, it is also possible to play various kinds of ability setting type games as by the systems shown in FIGS. 1 and 7.

In this embodiment, the picture display units 18 and 38 and the game control units 14 and 34 may be used also as the password display portions 74a and 74b and the password input portions 72a and 72b, respectively. It is also possible to dispense with the password display portions 74a and 74b and the password input portions 72a and 72b and assign their functions thereof solely to the picture displayed by the picture display unit 18. In this case, the pass word input portions 72a and 72b are constituted in the form of transparent touch buttons provided on the displayed picture.

In the system of this embodiment, it is also possible to constitute the commercial video game machine 30 so as to enable a plurality of players to play the game simultaneously as shown in FIG. 2. In this case, the commercial video game machine 30 is so constituted as to input the password of each player at the time of start of the game and display it at the time of suspension of the game by using the same password input portion 72a and the same password display portion 72a, respectively.

The present invention is not restricted to these embodiments, and various modification can be made within the spirit and scope of the invention.

For example, in the first embodiment shown in FIG. 1, the program memory 12 may be integrally incorporated into the home video game machine 10 and the ability data storage medium 22 alone may be freely mounted on and removed from the game machine body through the cartridge connector 60a. In this case, the ability data storage medium 22 itself may be made of a backup RAM.

Alternatively, the ability data storage medium 22 itself may be made of a magnetic card, IC card, magnetic disk, or another recording medium. It is also possible to integrally make the ability data storage medium 22 and the program memory 12 by using a magnetic card, IC card, magnetic disk, or another recording medium.

As described above, according to the present invention, an ability setting type game which has hitherto been played only in the limited space of a home game can be played in the commercial game space of a higher grade than that of the home video game, thereby enhancing the pleasure of the game.

In addition, according to the present invention, since it is possible to challenge a commercial video game of a higher grade after sufficiently practicing a home video game corresponding thereto as the training game therefor, the player can enjoy the pleasure of the commercial video game in the necessary shortest time in a game house, for example.

Furthermore, according to the present invention, by constituting the system so that a plurality of players can input the ability data of the respective characters into the commercial video game machine separately from each other, a plurality of players can play the commercial video game simultaneously with the abilities set separately by the respective players, thereby further enhancing the pleasure of the game.

What is claimed is:

1. A game system comprising:
   a home video game machine in which a game is played and the ability of a character which appears in said game is calculated and set with the progress of said game in accordance with a predetermined home game program; and
   a commercial video game machine in which a game is played in a commercial game space of a higher grade than that of the home game space and the ability of a character which appears in said game is calculated and set with the progress of said game in accordance with a commercial game program for playing a commercial game which is produced by expanding said home game;
   said home video game machine including means for externally outputting the ability of said character at the time of suspension of said game; and
   said commercial video game machine including means for inputting the ability of said character at the time of suspension of said game which has been output from said home video game machine as the initial ability data of said character which appears in said commercial video game.

2. A game system according to claim 1, wherein said commercial video game machine includes:
   means for enabling a plurality of players to input the initial ability data of each of the characters which appear in said commercial video game; and
   a plurality of game control units for operating said characters which correspond to said plurality of players;
   whereby said plurality of players can play simultaneously in the same commercial game space.

3. A game system comprising:
   a home video game machine in which a game is played and the ability of a character which appears in said game is calculated and set with the progress of said game in accordance with a predetermined home game program; and
   a commercial video game machine in which a game is played in a commercial game space of a higher grade than that of the home game space and the ability of a character which appears in said game is calculated and set with the progress of said game in accordance with a commercial game program for playing a commercial game which is produced by expanding said home game;

said home video game machine including:

a home program memory in which a home game program of an ability setting type is registered in advance;

a home game control unit through which a player inputs a game operation signal;

a working memory containing an ability data storage area;

an ability data storage medium removably provided on a connector attached to the game machine body;

a home game arithmetic circuit for computing a game picture on the basis of said home game program and an input game signal and calculating said ability of said character which appears in said game with the progress of said game to store the calculated ability in said ability data storage area in said working memory; and a home picture display unit for displaying the computed game picture;

said home game arithmetic circuit writing the ability data of said character stored in said ability data storage area into said ability data storage medium at the time of suspension of said game; and said commercial video game machine including:

a commercial game program memory in which a commercial game program for producing said commercial game space of a higher grade than that of said home game space by expanding said home game program is registered in advance;

a commercial game control unit through which said player inputs a game operation signal;

a commercial working memory containing an ability data storage area;

a connector on which said ability data storage medium of said home video game machine is removably mounted;

a commercial game arithmetic circuit for computing a game picture by using the ability data of said character stored in said ability data storage medium mounted on said connector as the initial ability data of said character which appears on said commercial game and on the basis of said commercial game program and an input game signal and calculating said ability of said character which appears in said game with the progress of said game to store the calculated ability data in said ability data storage area in said working memory; and a commercial picture display unit for displaying the computed game picture;

whereby the ability of said character at the time of suspension of said home video game is input to said commercial video game machine as the initial ability data of said character which appears in said commercial video game by mounting said ability data storage medium attached to said home video game machine at the time of suspension of said home game on said connector of said commercial video game machine.

4. A game system according to claim 3, wherein said home program memory and said ability data storage medium of said home video game machine is integrally constituted in the form of a cartridge, and said cartridge is removably mounted on said game machine body through said connector.

5. A game system according to claim 4, wherein said ability data storage medium accommodated in said cartridge is made of an RAM provided with a backup battery, so that the content stored in said RAM is not erased even when the power source of said machine body is turned off.

6. A game system according to claim 3, wherein said commercial video game machine writes the ability data of said character which is stored in said ability data storage area in said working memory into said ability data storage medium by using said commercial game arithmetic circuit at the time of suspension of said game; and said home video game machine writes the ability data of said character at the time of suspension of said commercial video game into said ability data storage area of said working memory as the initial ability data of said character which appears in said home video game by using said home game arithmetic circuit when said ability data storage medium removed from said commercial video game machine is mounted on said home video game machine.

7. A game system comprising:

a home video game machine in which a game is played and the ability of a character which appears in said game is calculated and set with the progress of said game in accordance with a predetermined home game program; and a commercial video game machine in which a game is played in a commercial game space of a higher grade than that of the home game space and the ability of a character which appears in said game is calculated and set with the progress of said game in accordance with a commercial game program for playing a commercial game which is produced by expanding said home game;

said home video game machine including:

a home program memory in which a home game program of an ability setting type is registered in advance;

a game control unit through which a player inputs a game operation signal;

a working memory containing an ability data storage area;

a home game arithmetic circuit for computing a game picture on the basis of said home game program and an input game signal and calculating said ability of said character which appears in said game with the progress of said game to store the calculated ability in said ability data storage area; and a home picture display unit for displaying the computed game picture;

said working memory being so composed that at least said ability data storage area is freely mounted on and removed from said game machine body through a connector; and said commercial video game machine including:

a commercial game program memory in which a commercial game program for producing said commercial game space of a higher grade than that of said home game space is registered in advance;

a game control unit through which said player inputs a game operation signal;

a connector on which said ability data storage area of said home video game machine is removably mounted;

a working memory which functions as a working memory area in combination with said ability data storage area mounted on said connector;

a commercial game arithmetic circuit for computing a game picture by using the ability data of said character stored in said ability data storage area mounted on said connector as the initial ability data of said character which appears on said commercial game and on the basis of said commercial game program and an input game signal and calculating said ability of said character which appears in said game with the progress of said game to store the calculated ability in said ability data storage area; and a commercial picture display unit for displaying the computed game picture;

whereby the ability data of said character at the time of suspension of said home video game is input to said commercial video game machine as the initial ability data of said character which appears in said commercial video game by mounting said ability data storage area removed from said home video game machine on said connector of said commercial video game machine.

8. A game system according to claim 7, wherein said ability data storage area is an RAM cartridge which is removably mounted on each connector of said home video game machine and said commercial video game machine and said RAM cartridge is provided with a built-in backup battery, so that the content stored in said RAM is not erased even when the power source of said machine body is turned off.

9. A game system according to claim 7, wherein said home video game machine inputs the ability data of said character at the time of suspension of said commercial video game as the initial ability data of said character which appears in said home video game by mounting said ability data storage area removed from said commercial video game machine on said game machine body through said connector.

10. A game system comprising:
a home video game machine in which a game is played and the ability of a character which appears in said game is calculated and set with the progress of said game in accordance with a predetermined home game program; and a commercial video game machine in which a game is played in a commercial game space of a higher grade than that of the home game space and the ability of a character which appears in said game is calculated and set with the progress of said game in accordance with a commercial game program for playing a commercial game which is produced by expanding said home game;

said home video game machine including:
a home program memory in which a home game program of an ability setting type is registered in advance;

a game control unit through which a player inputs a game operation signal;

a home working memory containing an ability data storage area;

a home game arithmetic circuit for computing a game picture on the basis of said home game program and an input game signal and calculating said ability of said character which appears in said game with the progress of said game to store the calculated ability in said ability data storage area; and a home picture display unit for displaying the computed game picture;

said ability data storage area of said working memory being freely mounted on and removed from said game machine body through a connector; and said commercial video game machine including:
a commercial game program memory in which a commercial game program for producing said commercial game space of a higher grade than that of said home game space is registered in advance;

a game control unit through which said player inputs a game operation signal;

a connector on which said ability data storage area of said home video game machine is removably mounted;

a commercial working memory including a commercial ability data storage area;

a commercial game arithmetic circuit for computing a game picture by using the ability data of said character stored in said ability data storage area mounted on said connector as the initial ability data of said character which appears on said commercial game and on the basis of said commercial game program and an input game signal and calculating said ability of said character which appears in said game with the progress of said game to store the calculated ability data in said commercial ability data storage area; and a commercial picture display unit for displaying the computed game picture;

whereby the ability of said character at the time of suspension of said home video game is input to said commercial video game machine as the initial ability data of said character which appears in said commercial video game by mounting said ability data storage area mounted on said home video game machine on said connector of said commercial video game machine.

11. A game system according to claim 10, wherein at least said ability data storage area in said home working memory is an RAM cartridge which is removably mounted on each connector of said home video game machine and said commercial video game machine and said RAM cartridge is provided with a built-in backup battery, so that the content stored in said RAM is not erased even when the power source of said machine body is turned off.

12. A game system according to claim 10, wherein
said commercial video game machine writes the ability data of said character which is stored in said commercial ability data storage area in said commercial working memory into said ability data storage area of said home video game machine which is attached to said connector at the time of suspension of said game; and said home video game machine inputs the ability data of said character at the time of suspension of said commercial video game as the initial ability data of said character which appears in said home video game by mounting said ability data storage area removed from said commercial video game machine on said home video game machine through said connector.

13. A game system comprising:
a home video game machine in which a game is played and the ability of a character which appears in said game is calculated and set with the progress of said game in accordance with a predetermined home game program; and a commercial video game machine in which a game is played in a commercial game space of a higher grade than that of the home game space and the ability of a character which appears in said game is calculated and set with the progress of said game in accordance with a commercial game program for playing a commercial game which is produced by expanding said home game;

said home video game machine including:

a home program memory in which a home game program of an ability setting type is registered in advance;

a home game control unit through which a player inputs a game operation signal;

a working memory provided with an ability data storage area;

a home game arithmetic circuit for computing a game picture on the basis of said home game program and an input game signal and calculating said ability of said character which appears in said game with the progress of said game to store the calculated ability in said ability data storage area; and a home picture display unit for displaying the computed game picture;

a home convertor for converting the ability data of said character which is stored in said ability data storage area at the time of suspension of said game into a password and outputting said password; and a home password display portion for displaying said password; and said commercial video game machine including:

a commercial game program memory in which a commercial game program for producing said commercial game space of a higher grade than that of said home game space is registered in advance;

a commercial game control unit through which said player inputs a game operation signal;

a working memory provided with an ability data storage area;

a commercial password input portion for inputting the initial data of said character as said password;

a commercial converter for converting said password input at the start of said commercial game into the initial ability data of said character and storing said ability data into said ability data storage area of said working memory;

a commercial game arithmetic circuit for computing a game picture on the basis of said commercial game program and an input game signal and calculating said ability of said character which appears in said game with the progress of said game to store the calculated ability data in said ability data storage area; and a commercial picture display unit for displaying the computed game picture;

whereby the ability of said character at the time of suspension of said home video game is input to said commercial video game machine as the initial ability data of said character which appears in said commercial video game by inputting said password displayed in said home password display portion at the time of suspension of said home video game through said commercial password input portion of said commercial video game machine.

14. A game system according to claim 13, wherein said commercial video game includes a commercial password display portion for displaying a password so that the ability data of said character which is stored in said ability data storage area of said working memory at the time of suspension of said commercial video game is converted into a password by said commercial converter and displayed at said commercial password display portion; and said home video game machine includes a home password input portion for inputting the initial ability data of said character as a password so that said password input at the start of said home video game is converted into the initial data of said character by said home converter and is written in said ability data storage area of said working memory;

whereby the ability of said character at the time of suspension of said commercial video game is input to said home video game machine as the initial ability data of said character which appears in said home video game.

* * * * *